(No Model.)
O. E. LUNDSTEDT.
GALVANOMETER.
No. 338,178. Patented Mar. 16, 1886.
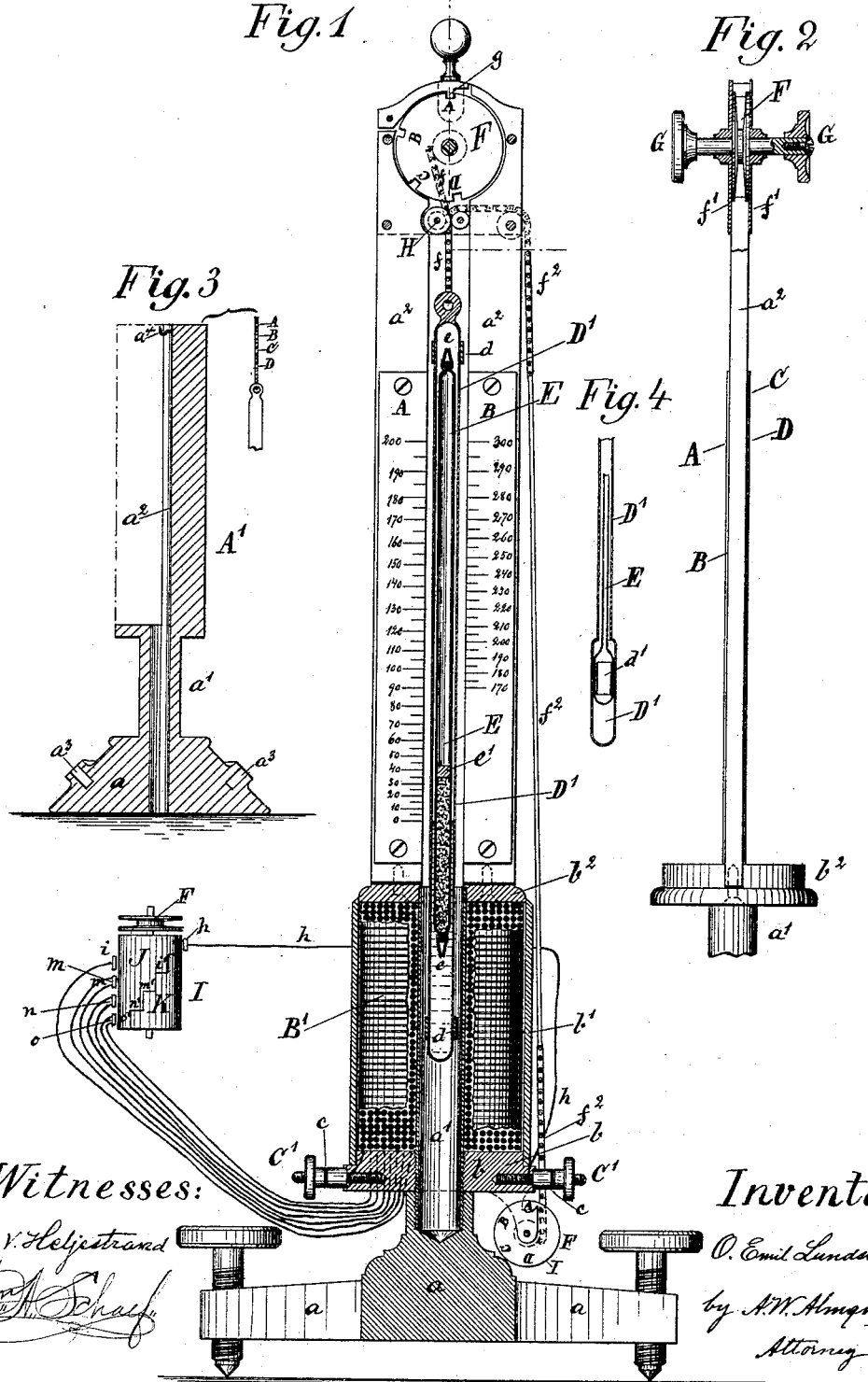
Witnesses:
C. V. Heljestrand
Wm. A. Schaaf
Inventor:
O. Emil Lundstedt
by A. W. Almqvist
Attorney

UNITED STATES PATENT OFFICE.

O. EMIL LUNDSTEDT, OF BROOKLYN, NEW YORK.

GALVANOMETER.

SPECIFICATION forming part of Letters Patent No. 338,178, dated March 16, 1886.

Application filed March 5, 1885. Serial No. 157,793. (No model.)

*To all whom it may concern:*

Be it known that I, O. EMIL LUNDSTEDT, a citizen of Sweden, and a resident of Brooklyn, in the county of Kings and State of New York, have invented certain new and useful Improvements in Galvanometers, of which the following is a specification.

The object of my invention is to provide an improved instrument for measuring the force of electric currents in degrees corresponding to ampères or other adopted units.

The invention is founded upon the principle that a magnetizable core, movable axially in an electric coil or helix, will be attracted with a force proportional to the strength of the electric current passing through the said helix.

The invention consists, generically, in the combination of an electric coil or helix, a transparent tube partly filled with a liquid and suspended in the axial line of the said helix, a rod or float free to slide within the said tube while buoyant on the said liquid and having at its lower end a substance attractable by electro-magnetic force, and a scale indicating the rise of the liquid displaced by the float under the influence of the electric current.

It also consists in the special construction of the galvanometer-stand, and in the combination of parts, whereby the range of the scale may be readily increased to measure currents of greatly increased force, as will be hereinafter described with reference to the accompanying drawings, in which—

Figure 1 represents a front sectional elevation of my improved galvanometer. Fig. 2 is an edge view of the stand, partly broken out and in section. Fig. 3 is a vertical section of the stand as adapted for the cheapest construction. Fig. 4 is a detail section showing a form of the tube and float adapted to use liquid of little density, so as to indicate the force of very weak currents.

A' designates the stand, consisting of three main parts—the base $a$, the coil-tube $a'$, and the scale-post $a^2$. In the more expensive kind of my galvanometer (shown in Figs. 1 and 2) the base $a$ and tube $a'$ are made of brass, the latter being screwed into the former, and the base provided with adjusting-screws as feet, so as to facilitate placing the instrument in a truly vertical position. The helix or coil B', of a greater or less number of windings, is wound upon the tube $a'$, and inclosed in an insulating-casing, $b$ $b'$ $b^2$, in the bottom plate, $b$, of which are secured the binding-posts C', which are adapted for attachment at $c$ of the circuit-wires, through which passes the current to be measured.

To the cap $b^2$ of the helix-casing are secured, with a central opening intervening, two vertical brass bars, which constitute the post $a^2$, and have secured to them on opposite sides, front and back, graduated scale-plates A B C D. In the central opening of the post $a^2$ is suspended, with its lower end partly into the the helix-tube $a'$, a cylindrical glass tube, D', which is surrounded at intervals with rubber rings $d$, to prevent the glass from contact with the stand, and is filled partly with mercury. Within the tube D' is a rod or another tube, E, of an outer diameter sufficiently smaller than the inner diameter of D' to allow the mercury in the latter displaced by the lower end of the tube E to rise between them. The ends of the tube E are provided with soft-rubber tips $e$, to prevent damage by concussion. The tube E floats upon the mercury in the tube D', and is partly filled with iron dust or filings covered with a cork plug, $e'$. When a current is passed through the helix, the iron in the tube E becomes the core of an electro-magnet, and the tube E is consequently drawn down into the brass tube $a'$ to a depth corresponding to the strength of the current, the displacement causing a proportionate rise of the mercury, which may be read off on the scale A, and indicates, in numbers of the adopted units, the strength of the current.

The tube D' is sufficiently smaller than the inner cross area of the tube $a'$ to allow the core freedom to adjust itself into the true magnetic axis of the helix. A cheap construction of the stand A' is shown in Fig. 3, and is made by turning the post $a^2$, coil-tube $a'$, and base $a$ in one piece out of wood, (or other insulating material,) boring it through axially to make it tubular, and then cutting away to the center the portion indicated in dotted lines.

In the base $a$ are bored sockets $a^3$ for receiving the binding-posts C', and a hook $a^4$ is fastened to the upper end of the scale-post for suspending the glass tube D' at any desired elevation. The scale may be graduated directly on the post or on a strip of paper or other substance attached to it.

As, owing to the density of the mercury, the minimum force required to displace it may exceed that exerted by a very weak current, I provide for the measurement of the latter the more sensitively-acting construction shown in Fig. 4. In this the tubes D' E are contracted, as shown, so as to make the tube E as light as possible and its lower end a bulb in comparison with the upper, and thus increase its buoyancy. For the core a very thin strip, d', of iron is inserted in the bulb of the tube E before closing the end thereof. Instead of mercury, the liquid used in the tube D' may be colored water, alcohol, or ether.

It is evident that the higher the tube D' is suspended in the axis of the coil B' the greater force is required to attract the core E. This fact I have taken advantage of to greatly increase the range of the instrument. For this purpose the tube D' is suspended by a chain, f, to the shaft of a drum, F, mounted between and supported in bearings in two plates, f', attached to the scale-post $a^2$, and the drum-shaft is provided with hand-knobs G, so that by turning the said knobs the tube D' may be raised or lowered, guide-pulleys H to the chain keeping the tube in the axial position. A pin, g, or stop-pawl pivoted between the plates f', engages notches in the disks of the drum F to retain the tube at the desired elevation. In the cheapest construction, in which the tube is suspended only on a stationary pin or hook, a simple strap having holes in it, as shown at the right side of Fig. 3, answers for the same purpose. The elevations determined by the notches or holes (marked A B, &c.) on the drum-wheel or strap correspond, respectively, with the graduated scales similarly marked. In addition to the scales A B, scales C D may be drawn in different colors upon or at the side of the scales A B; but better on the opposite side of the post $a^2$ when the latter is constructed as shown in Figs. 1 and 2.

The increase in range is easily understood with reference to Fig. 1. Suppose that we want to measure a force exceeding 200—the highest figure on scale A. Turn the scale-drum to raise the tube until the pin or pawl g engages the notch corresponding to the scale B. It will then be found that the same force which attracted the core E sufficiently to cause a rise of the mercury in tube D' to 200—the highest point on scale A—will now cause it to indicate the same number at the lower end of scale B, and a force as great as 300 will be indicated if the mercury again reaches the highest point.

In measuring a stronger current a greater resistance is required in the helix than when measuring a smaller force. For this purpose I have illustrated at the left side of Fig. 1 a switch, I, by which may be varied, according to such circumstances, the length of coil through which the current passes. When this is needed, the chain is brought out at the side of the post and led down, as shown at $f^2$, to the lower end of the instrument, where, instead of at the top, the drum F is then mounted in a suitable bracket, and the commutator or switch I is secured on the same shaft as the chain-drum, so that by turning the drum to correspond to a certain scale, B C, &c., a length of coil having corresponding mount of resistance will be switched in simultaneously.

The switch or commutator I consists of a wooden or other insulating cylinder, K, covered with a metallic sleeve, J, which latter is circumferentially continuous, for contact with the brush of one of the end wires, h, but is cut away in steps i' m' n' o', to keep one or more of the other brushes i m n o (which are placed in one line parallel with the axis of the cylinder K) out of contact with the metal and in contact with the wood when the switch I is turned sufficiently for the purpose. The two ends of the first or innermost winding of the helix are connected, respectively, to the brushes i and m, those of the second winding to the brushes m n, those of the third to the brushes n o, and those of the fourth to the brush o and the left binding-post, C'.

The relative positions of brushes and switch on the explanatory sketch at the left of the helix are supposed to correspond to the position of the chain-drum F at the right below the helix, the scale A being up. Circuit-wires of the current whose force is to be measured being attached to the binding-posts at c, the current passes from the wire h through the metal sleeve J and brush o directly to and through the fourth winding to the left binding-post. Now turn up scale B. This brings the brush o off the metal sleeve J and onto the insulating wood or rubber surface K. The current consequently passes through the brush n and the third winding, thence through the brush o and back again to and through the fourth winding to the left binding-post. Now turn up scale C, (which brings also brush n onto the insulator K,) and the current passes through brush m and the three outer windings. Now insulate also brush m, by turning up scale D, and the current passes through brush i and all the windings of the helix. If the switch is turned far enough to bring all the brushes onto the insulator K, the instrument will be out of circuit.

Having thus described my invention, I claim as new and desire to secure by Letters Patent—

1. A galvanometer consisting in the combination of an electric coil or helix, a transparent tube partly filled with a liquid and suspended in the axial line of the said helix, a rod or float of uniform size, of cross-section slightly smaller than the interior cross-section of the said tube and free to slide within the said tube while buoyant on the said liquid, the said rod or float having its lower end hermetically sealed and provided with a substance attractable by electro-magnetic force, and a stationary scale indicating the rise in the space between the said float and tube of the liquid displaced by the float under the influence of the electric current.

2. The galvanometer-stand A', consisting of the base $a$, helix-tube $a'$, and scale-post $a^2$, made in one piece of insulating material, substantially as specified.

3. The combination of an electric coil or helix, a transparent tube partly filled with a liquid and adjustable as to elevation in the axial line of the said helix, a rod or float free to slide within the said tube while buoyant on the said liquid, and having at its lower end a substance attractable by electro-magnetic force, and a set of scales of different graduations indicating, in accordance with the adjusted elevation of the said tube, the rise of the liquid displaced by the float under the influence of the electric current, substantially as and for the purpose specified.

4. The combination of an electric coil or helix, a transparent tube partly filled with a liquid and adjustable as to elevation in the axial line of the said helix, a rod or float free to slide within the said tube while buoyant on the said liquid, and having at its lower end a substance attractable by electro - magnetic force, a set of scales of different graduations indicating, in accordance with the adjusted elevation of the said tube, the rise of the liquid displaced by the float under the influence of the electric current, and a switch I, bringing in operation more or less coil to vary the resistance, according to the electric force acting on the thus elevated tube and indicated by the corresponding scale, substantially as and for the purpose specified.

In testimony that I claim the foregoing as my invention I have signed my name, in presence of two witnesses, this 21st day of February, 1885.

O. EMIL LUNDSTEDT.

Witnesses:
A. W. ALMQVIST,
C. J. HELJESTRAND.